(12) United States Patent
Perelli et al.

(10) Patent No.: US 12,210,391 B2
(45) Date of Patent: Jan. 28, 2025

(54) COMPUTING DEVICE

(71) Applicant: LENOVO (SINGAPORE) PTE. LTD, Singapore (SG)

(72) Inventors: Thomas Perelli, Morrisville, NC (US); Ali Ent, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 257 days.

(21) Appl. No.: 17/877,960

(22) Filed: Jul. 31, 2022

(65) Prior Publication Data

US 2024/0036615 A1 Feb. 1, 2024

(51) Int. Cl.
  *G06F 1/16* (2006.01)
(52) U.S. Cl.
  CPC .......... *G06F 1/1679* (2013.01); *G06F 1/1681* (2013.01)
(58) Field of Classification Search
  CPC .............................. G06F 1/1679; G06F 1/1681
  See application file for complete search history.

(56) References Cited

U.S. PATENT DOCUMENTS

| | | | | |
|---|---|---|---|---|
| 4,941,841 A * | 7/1990 | Darden | ................ | H05K 5/0286 439/304 |
| 5,168,427 A * | 12/1992 | Clancy | ...................... | B41J 5/10 361/679.55 |
| 5,278,730 A * | 1/1994 | Kikinis | ................. | G06F 1/1656 361/679.55 |
| 5,537,343 A * | 7/1996 | Kikinis | ................... | G06F 1/183 361/679.41 |
| 5,646,820 A * | 7/1997 | Honda | .................... | G06F 1/203 381/386 |
| 6,267,608 B1 * | 7/2001 | Yagi | ...................... | H05K 5/0247 439/910 |
| 7,236,356 B2 * | 6/2007 | Ulla | ........................ | G06F 1/1626 361/679.55 |
| 9,204,571 B2 * | 12/2015 | Ou | ........................... | G06F 1/203 |
| 10,136,526 B2 * | 11/2018 | Chuang | ................ | H05K 5/0021 |
| 10,165,700 B1 * | 12/2018 | Sanders | ................ | G06F 1/1632 |
| 10,198,037 B2 * | 2/2019 | Belfiglio | ............... | G06F 1/1656 |
| 11,259,436 B2 * | 2/2022 | Chang | .................. | H05K 7/1489 |
| 11,927,990 B2 * | 3/2024 | Perelli | .................. | G06F 1/1626 |
| 2004/0085726 A1 * | 5/2004 | Ting | ....................... | G06F 1/1616 361/679.55 |
| 2005/0152110 A1 * | 7/2005 | Chen | ...................... | G06F 1/1632 |
| 2007/0258204 A1 * | 11/2007 | Chang | .................. | G06F 1/1656 361/679.55 |
| 2014/0204528 A1 * | 7/2014 | Huang | .................. | G06F 1/1635 361/679.55 |
| 2020/0245483 A1 * | 7/2020 | Alva | ...................... | G06F 1/1615 |
| 2021/0334417 A1 * | 10/2021 | Morrison | ............ | E05B 73/0082 |
| 2024/0036616 A1 * | 2/2024 | Perelli | ................... | G06F 1/1626 |

* cited by examiner

*Primary Examiner* — Adrian S Wilson
(74) *Attorney, Agent, or Firm* — Brian J. Pangrle

(57) ABSTRACT

A computing device can include a processor; memory accessible to the processor; a display housing that includes a display operatively coupled to the processor; a base housing that includes a keyboard operatively coupled to the processor, a shell and a component space access hatch that define a component space, and a controllable latch to lock and unlock the component space access hatch; a hinge assembly that couples the display housing and the base housing; and circuitry operatively coupled to the keyboard and the controllable latch that unlocks the component space access hatch responsive to receipt of a code from the keyboard.

19 Claims, 13 Drawing Sheets

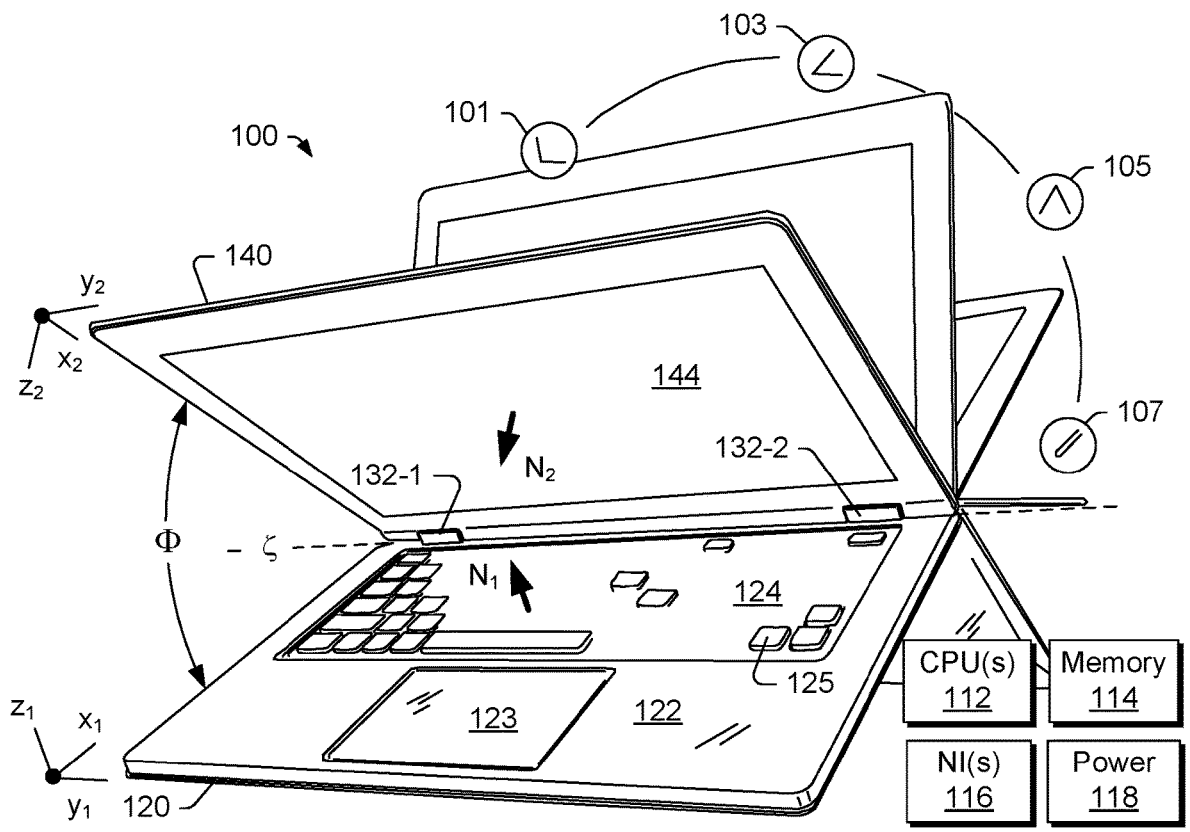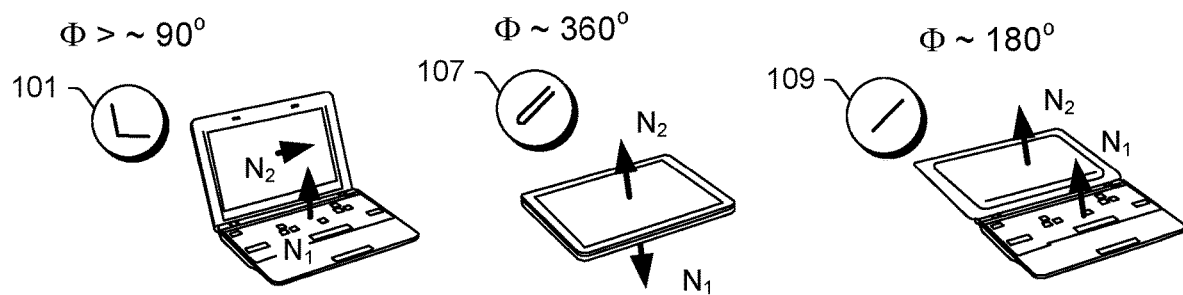
FIG. 1

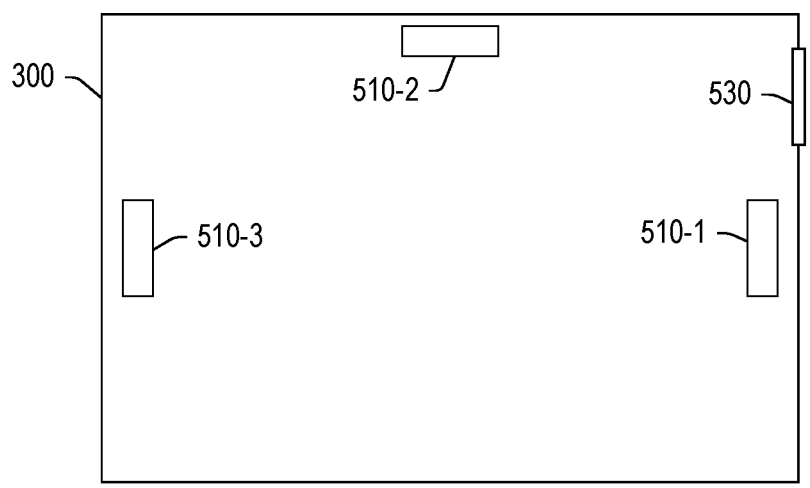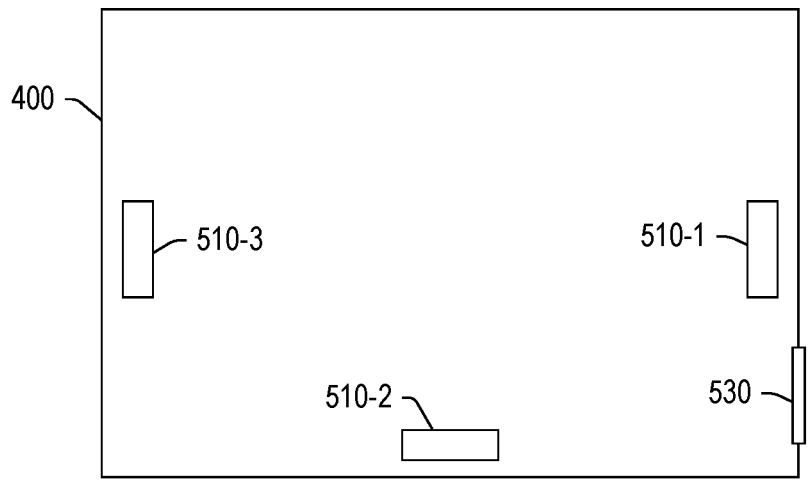
FIG. 5

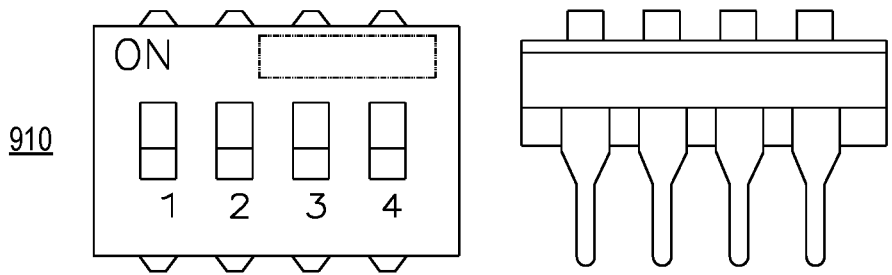
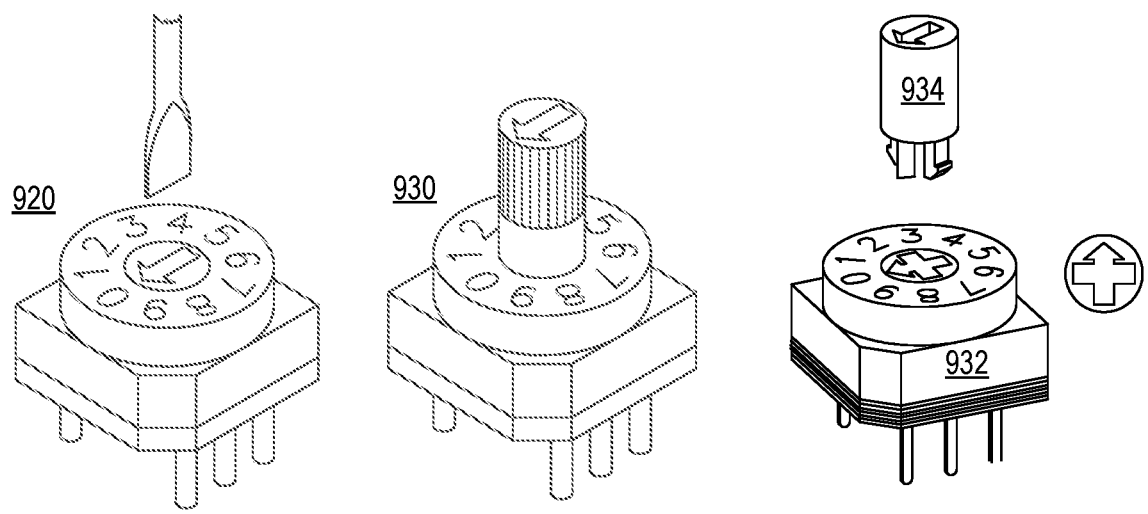
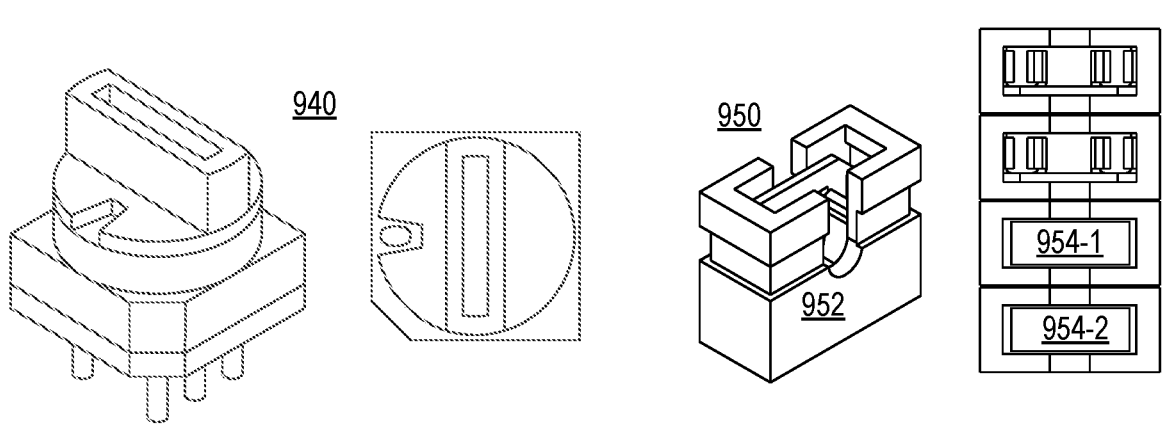
FIG. 9

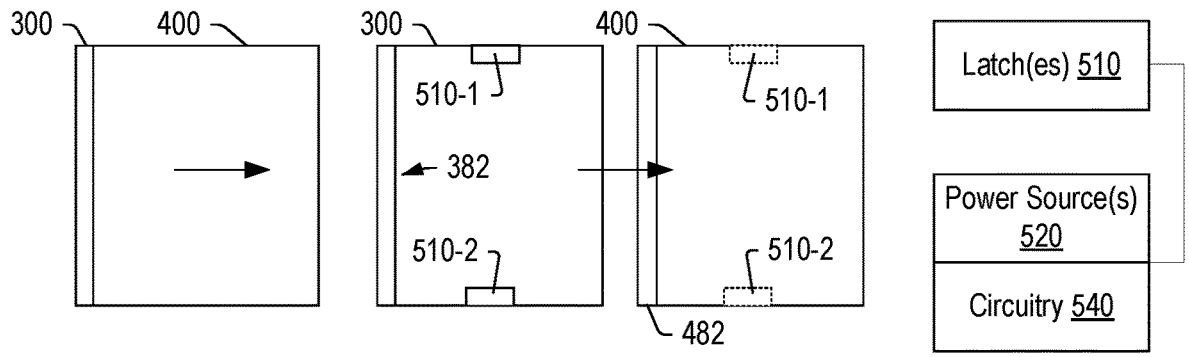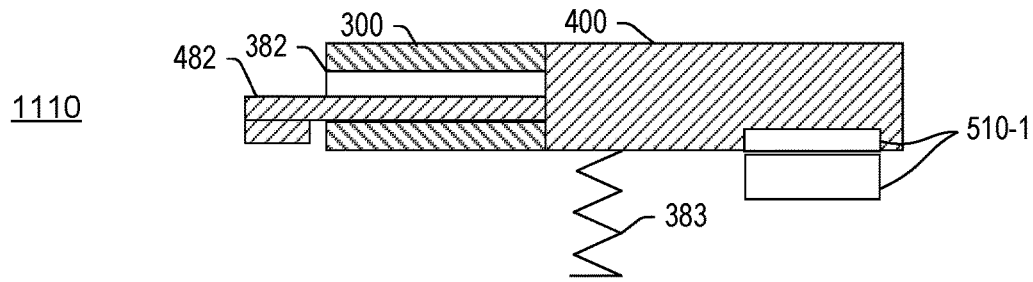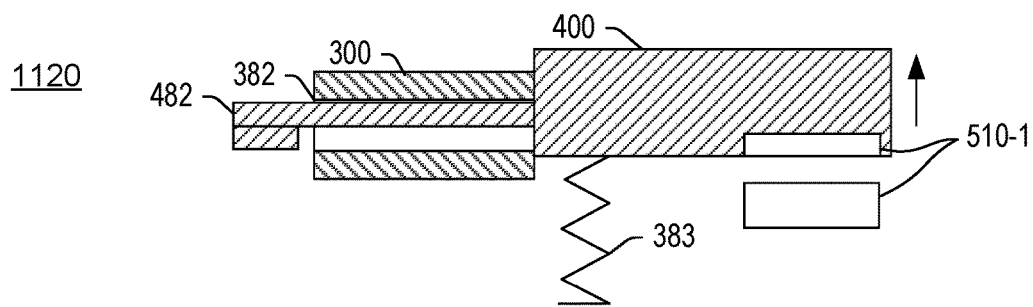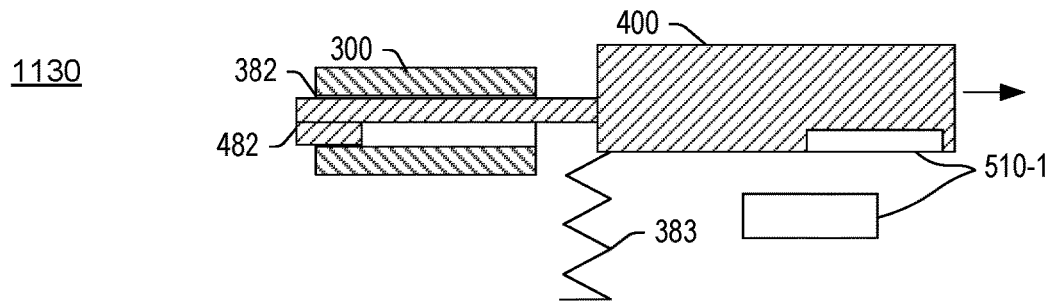
FIG. 11

Method 1200

Generate a code for a plurality of computing devices, where each of the computing devices includes a base housing that includes a shell and a component space access hatch that define a component space, a controllable latch, and circuitry operatively coupled to the controllable latch that unlocks the component space access hatch responsive to receipt of the code
1210 responsive to receipt of the code by one of the computing devices, unlock the component space access hatch
1220

For at least the one of the computing devices, change the code
1230

FIG. 12

COMPUTING DEVICE

TECHNICAL FIELD

Subject matter disclosed herein generally relates to technology for computing or other devices.

BACKGROUND

A notebook computer, or laptop computer, can include two housing joined by a hinge assembly where one or both of the housings is formed by shells such as two shells that can be joined to define a housing space suitable for housing various components.

SUMMARY

A computing device can include a processor; memory accessible to the processor; a display housing that includes a display operatively coupled to the processor; a base housing that includes a keyboard operatively coupled to the processor, a shell and a component space access hatch that define a component space, and a controllable latch to lock and unlock the component space access hatch; a hinge assembly that couples the display housing and the base housing; and circuitry operatively coupled to the keyboard and the controllable latch that unlocks the component space access hatch responsive to receipt of a code from the keyboard. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 1 is a diagram of an example of a device;

FIG. 5 is a series of diagrams of an example of a computing device;

FIG. 9 is a series of diagrams of examples of hardware components;

FIG. 11 is a series of diagrams of an example of a method and examples of components of a housing;

FIG. 12 is a diagram of an example of a method; and

DETAILED DESCRIPTION

Figure 2:
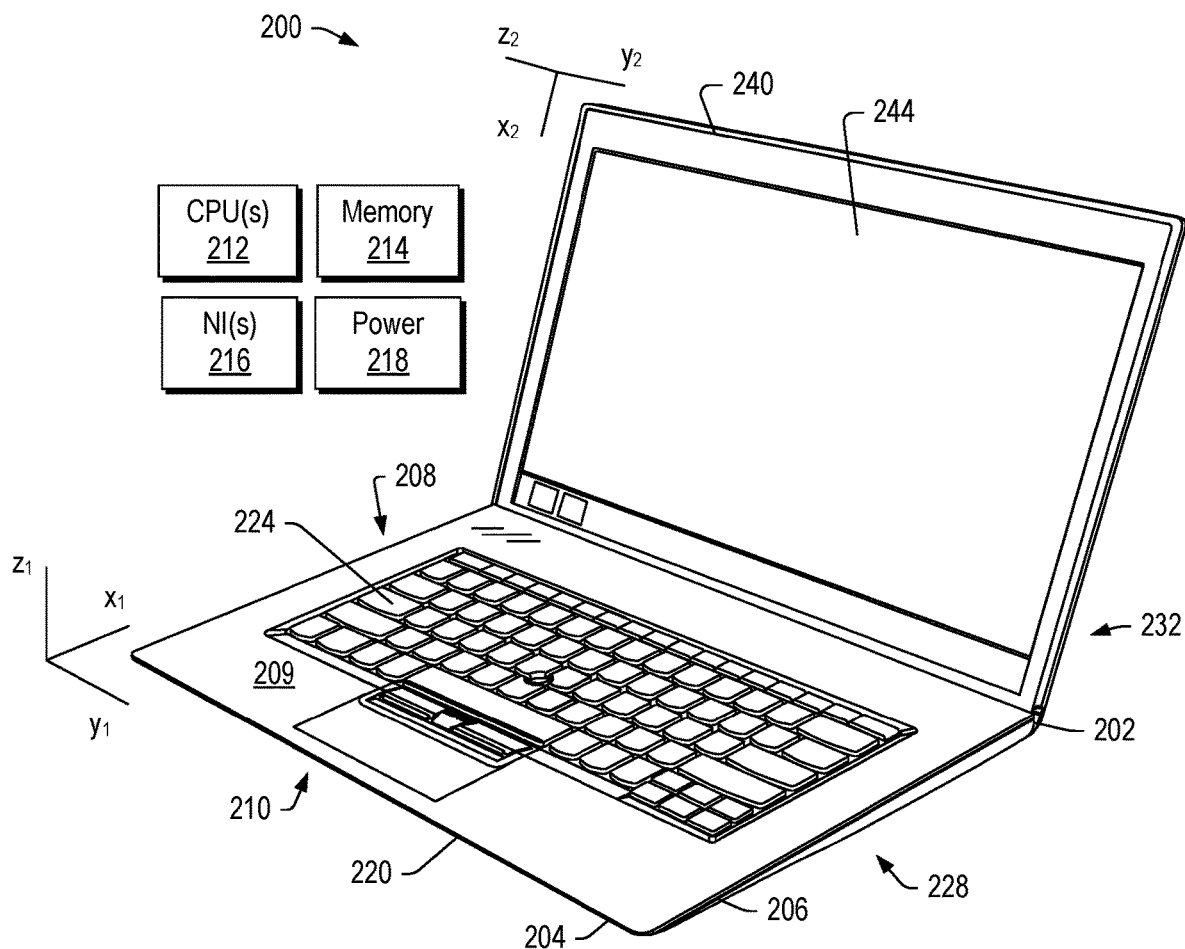
FIG. 2 is a diagram of an example of a device.

The following description includes the best mode presently contemplated for practicing the described implementations. This description is not to be taken in a limiting sense, but rather is made merely for the purpose of describing general principles of various implementations. The scope of invention should be ascertained with reference to issued claims.

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

FIG. 2 shows an example of a device 200 that includes various features of the device 100 of FIG. 1.

As shown in FIG. 2, the device 200 includes a keyboard housing 220 and a display housing 240 that are pivotable with respect to each other via movement about one or more hinges 232 (e.g., one or more hinge assemblies). The device 200 may be a device such as, for example, a computing device (e.g., an information handling device). As shown, the keyboard housing 220 includes a keyboard 224 (e.g., with typewriter keys) and the display housing 240 includes a display 244.

In the example of FIG. 2, the device 200 includes a hinge assembly side 202, a front side 204, a right side 206, a left side 208, a keyboard side 209 and, opposing keyboard side 209, a bottom side 210. An area defined by the sides 202, 204, 206 and 208 can be a footprint; noting that the bottom side 210 can define a footprint.

As an example, the device 200 may include one or more processors 212, memory 214 (e.g., one or more memory devices), one or more network interfaces 216, and one or more power cells 218. Such components may be, for example, housed with the keyboard housing 220, the display housing 240, and/or the keyboard housing 220 and the display housing 240.

Figure 3:
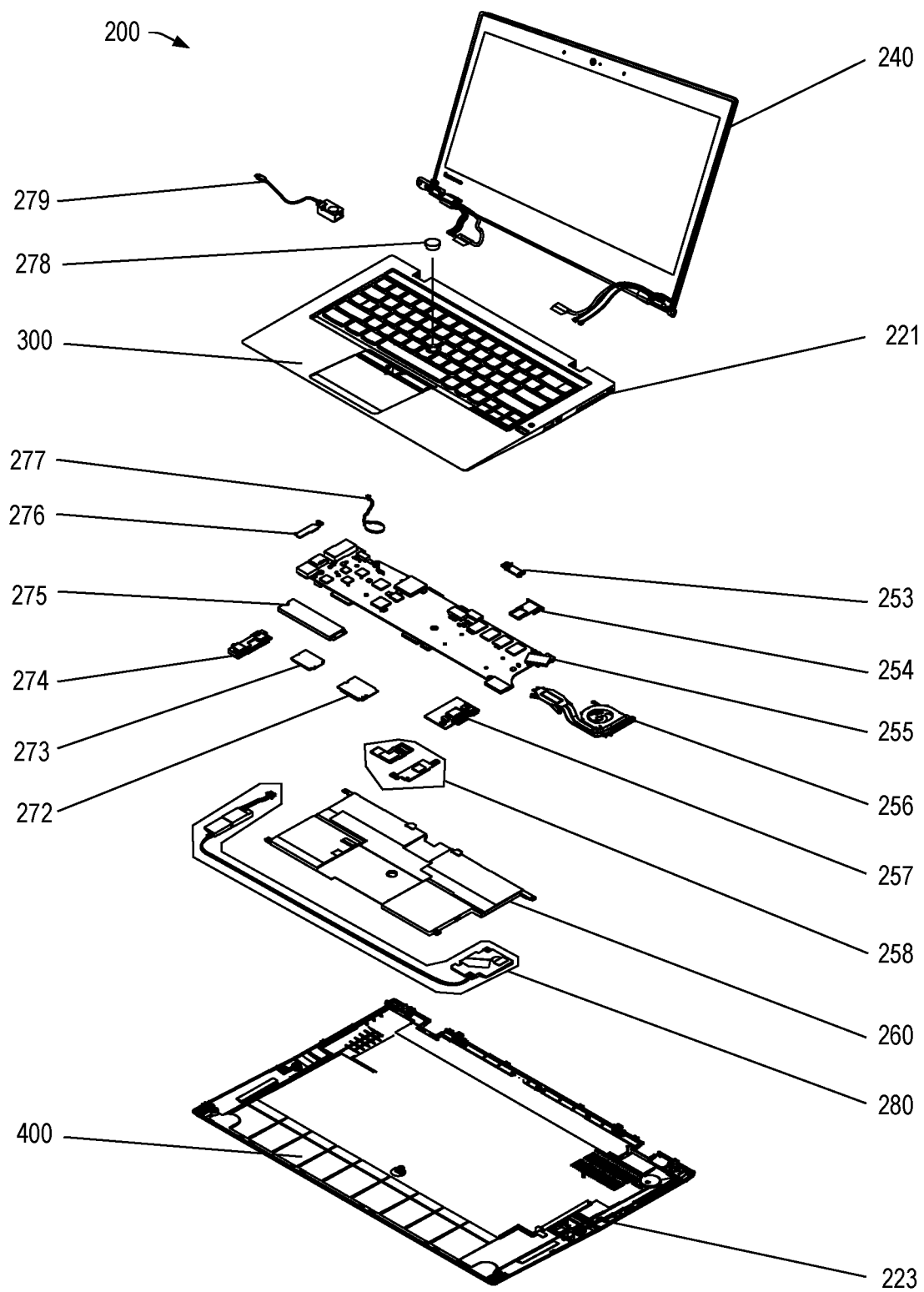
FIG. 3 is a diagram of an example of the device of FIG. 2.

FIG. 3 shows an exploded view of the device 200 of FIG. 2, which shows the display housing 240, an upper assembly of the keyboard housing 221 and a lower assembly of the keyboard housing 223 where the upper assembly of the keyboard housing 221 and the lower assembly of the keyboard housing 223 can be joined to form the keyboard housing 220. As shown, the upper assembly of the keyboard housing 221 includes a keyboard as a human input device. As an example, the lower assembly of the keyboard housing 223 can be a base cover assembly that covers the upper assembly of the keyboard housing 221; noting that various components may be mechanically coupled to the upper assembly of the keyboard housing 221 where, for example, screws, bolts, etc., may be positioned in through bores and/or bosses of the lower assembly of the keyboard housing 223 to thread into bores and/or bosses of the upper assembly of the keyboard housing 221. As an example, during servicing, the lower assembly of the keyboard housing 221 may be removed via unscrewing of screws, bolts, etc., to access various components of the keyboard housing 220. Further, various types of clips may be utilized for securing and/or positioning components where, for example, the clips may be broken, lost, misplaced, etc. Such clips may be metallic and/or plastic and present various issues during servicing or otherwise during lifetime of a computer.

As an example, a laptop computer (e.g., a notebook computer) can include a display housing that is an assembly that includes one or more covers or shells and can include a keyboard housing that is an assembly that includes one or more covers or shells. For example, a display housing can include an A-cover and a B-cover that mate where the A-cover forms a back side of the display housing and where the B-cover forms a bezel on a front side or display side of the display housing about a display (e.g., a display surface) and, for example, a keyboard housing can include a C-cover and a D-cover that mate where the C-cover forms a front side or a keyboard side of the keyboard housing and where the D-cover forms a back side, bottom side or base side of the keyboard housing.

In the example of FIG. 3, the lower assembly of the keyboard housing 223 includes a shell 400 that is a D-cover that covers the upper assembly of the keyboard housing 221, which includes a shell 300 that is a C-cover. In such an example, a D-cover assembly and a C-cover assembly can each include a respective one of the shells 400 and 300 where the shell 400 can be referred to as a D-cover shell and the shell 300 can be referred to as a C-cover shell.

As an example, a shell can be a part that is formed by one or more processes such as, for example, molding (e.g., injection molding), 3D printing (e.g., additive manufacturing, etc.), stamping (e.g., metallic sheet stamping), etc. As an example, a shell can include an injection molded part and a stamped part where, for example, the injection molded part is an insert for the stamped part or vice versa.

Various examples of components are shown in FIG. 3, including a SIM card tray bracket 253, a SIM card tray 254, a system board assembly 255 (e.g., a motherboard), a fan 256, an RJ45 card with a USB connector 257, a fingerprint reader assembly 258, a lithium ion battery 260, a speaker assembly 280, a wireless WAN card 272, a wireless LAN card 273, an audio card with a USB connector 274 (e.g., audio circuitry), a M.2 solid-state drive 275, a DC-in bracket 276 (e.g., for DC power), a coin-cell battery (e.g., for back-up power) 277, a trackpoint cap 278 for a trackpoint human input device (HID), and an Ethernet extension adapter 279.

As explained, various components can be housed in a housing that is formed at least in part by two shells that can be joined where if one or more of the components is in need of servicing (e.g., replacement, repair, etc.), the two shells can be decoupled (e.g., de-joined) and/or separated such that one or more of such components can be accessed.

Figure 4:
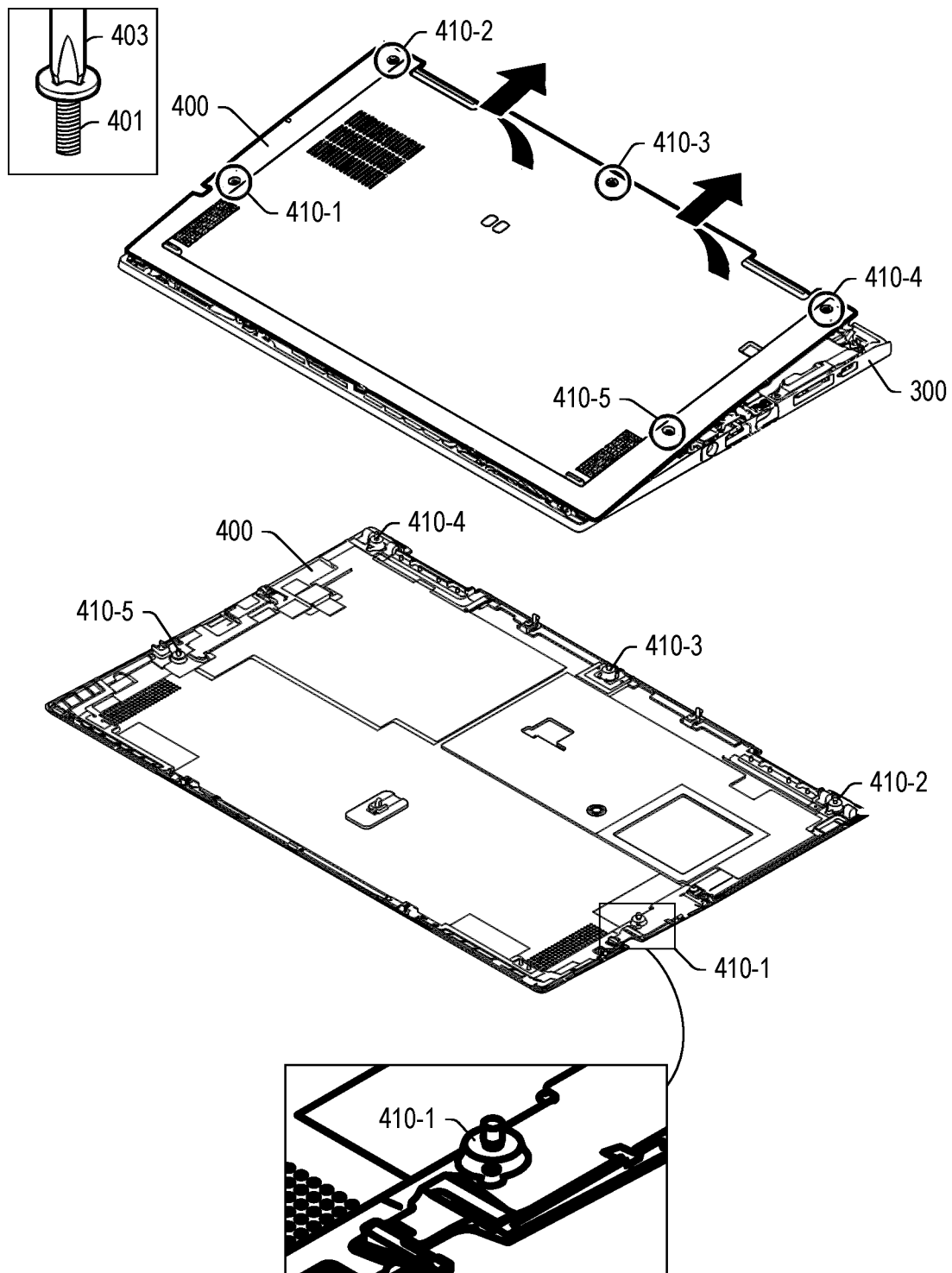
FIG. 4 is a diagram of the example of the device of FIG. 2.

FIG. 4 shows an example of a method with respect to the shells 300 and 400. As indicated, the shells 300 and 400 can be mechanically joined via a number of rotatable securing components 401 (e.g., screws, bolts, etc.) that can be rotated using a tool 403 such as, for example, a screwdriver, a socket wrench, etc. A rotatable securing component may include features such as threads or a bayonet.

In the example of FIG. 4, five receptacles 410-1, 410-2, 410-3, 410-4 and 410-5 are shown as being part of the shell 400 that can each receive an instance of the rotatable securing component 401, which can be rotatable to secure the shell 400 to the shell 300 via corresponding receptacles of the shell 300. As shown in FIG. 4, the shell 400 can be formed of a material (e.g., metal, plastic, carbon fiber, composite, etc.) where each of the receptacles 410-1, 410-2, 410-3, 410-4 and 410-5 has a boss with a through-bore to receive an instance of the rotatable securing component 401. And, correspondingly, the shell 300 includes such bosses, which can include features such as threads, bayonets, etc., that mate with features of the rotatable securing component 401. In such an example, overtightening may result in damage (e.g., stress fractures, stripping, etc.), misalignment may result in damage (e.g., cross-threading, stress fractures, etc.), debris may result in damage, etc. Further, the presence of relatively small screws or bolts can lead to various issues such as, for example, loss, misplacement, vibration or rattling when loose or lost in a housing, electrical short circuiting if conductive and/or placing pressure on a component or components, etc. Additionally, during assembly or disassembly, an individual must have the appropriate tool and take care to not lose or misplace screws, bolts, etc., and to properly align and torque when rejoining two shells of a housing. For various reasons, receptacles and rotatable securing components can be sub-optimal.

Various notebook form factor devices utilize screws to join a D-cover to a C-cover. Screws pose a risk of being over-torqued, which can cause damage to either or both of a C-cover and a D-cover. Further, there is a risk of a screw or screws being lost or left inside a housing, which may present a safety risk or damage components.

As an example, a computing device can include a processor; memory accessible to the processor; a display housing that includes a display operatively coupled to the processor; a base housing that includes a keyboard operatively coupled to the processor, a shell and a component space access hatch that define a component space, and a controllable latch to lock and unlock the component space access hatch; a hinge assembly that couples the display housing and the base housing; and circuitry operatively coupled to the keyboard and the controllable latch that unlocks the component space access hatch responsive to receipt of a code from the keyboard.

FIG. 5 shows an example of the shell 300 and an example of the shell 400 along with one or more controllable latches 510-1, 510-2 and 510-3, which can include parts associated with the shell 300 and/or with the shell 400. In such an example, one of the shells 300 and 400 can be a component space access hatch. For example, the shells 300 and 400 can define a component space where one of the shells 300 and 400 can be released from the other one of the shells 300 and 400 for access to the component space. As shown in FIG. 5, one or more power sources 520, one or more interfaces 530 and circuitry 540 can be included as part of a housing formed at least in part by the two shells 300 and 400. In such an example, one or more of the controllable latches 510-1, 510-2 and 510-3 can lock and unlock a component space access hatch where the circuitry 540 is operatively coupled to a keyboard and at least one of the controllable latches 510-1, 510-2 and 510-3 to unlock the component space access hatch responsive to receipt of a code from the keyboard. In such an example, power may be supplied by at least one of the one or more power sources 520 for operation of one or more of the controllable latches 510-1, 510-2 and 510-3.

As an example, electrical power may be from one or more electrical power sources. For example, consider a lithium-ion battery that is a main electrical power source of a notebook device where the lithium-ion battery is disposed within a keyboard housing that includes C- and D-covers. As another example, a dedicated electrical power source may be provided, which may be a battery or another type of electrical power storage device (e.g., consider capacitor-based). As yet another example, a device can include one or more electrical power interfaces that can receive electrical power from an electrical power source or sources. For example, consider a USB port, a power brick port, a specialized interface, etc. As an example, where a main battery has insufficient power (e.g., drained below a certain level, dead, etc.), electrical power may be supplied via one or more other electrical power sources, which may be an internal source or an external source that can connect via an interface (e.g., wired and/or wireless). As to a wireless approach, consider the Qi standard technology and techniques where, for example, a device can include an antenna that can receive electrical energy where such electrical energy can be utilized as electrical power.

As explained, a power source can be an internal electrical power storage device (e.g., a battery, a capacitor, etc.) or may be an external electrical power source that can be electrically (e.g., or electromagnetically) coupled via one or more interfaces. As an example, the one or more interfaces 530 can include one or more wired and/or wireless interfaces.

As to a key, it can be an interface that may be a physical component that is actuatable. For example, consider a key that may be a depressible key of a keyboard that can be depressed to cause actuation of circuitry such as, for example, the circuitry 540 of FIG. 5. As an example, a series of keystrokes and/or a combination of keys may be utilized to cause actuation of circuitry. In such an example, the series of keystrokes and/or the combination of keys may provide for entry of a code where the circuitry can receive the code or otherwise receive a signal that provides of controllable latch actuation. In various instances, the code can be a secret code that may be known to a single individual or a number of authorized individuals, which may not include a user of a computing device. For example, consider a school, a library, a workspace, etc., where computing devices are available for users and where access to component spaces of the computing devices is restricted such that the users cannot access the component spaces. A service provider for the school, the library, the workspace, etc., can be in possession of a code that can be entered to unlock one or more computing devices for access to respective component spaces thereof.

As an example, a code may be changeable. For example, consider a code that can be changed only when a component space is accessed. In such an example, a service provider may enter a code to release a component access hatch and then change the code prior to closing and locking the component access hatch. As an example, a code may be a software code or a code may be a hardware code. As to a software code, it may be entered in one or more manners, for example, via a keyboard, a thumb drive, a touchpad, a touch-screen display, etc., where the software code is stored in a memory device, which may be a dedicated memory device that has restricted access. As to a hardware code, it may be entered in one or more manners, for example, via jumpers, dip switches, buttons, etc. A hardware code may demand physical contact such as changing a dip switch, positioning a jumper, depressing a button, etc. A service provider may write down, photograph, enter into a log, etc., a changed code such that future service can be provided through use of the changed code to access a component space.

As an example, a computing device can include a module that includes circuitry and optionally power where the circuitry may include an input device for changing a code. For example, consider a module that includes circuitry and a dip switch or one or more other hardware switches or circuitry and a small numeric, alpha, or alphanumeric touch display where a code can be entered. As an example, a module may be a security module that includes a security chip such as a trusted platform module (TPM) chip that can perform security checks for accessing components, accessing networks, accessing applications, booting to an operating system, etc. As an example, a module can have its own power source (e.g., a battery, etc.) and/or may include a power interface that can receive power from a power source. As an example, where a main battery of a computing device is drained, a module may access power from its own power source (if present) and/or may access power via plugging in a cord to the computing device (e.g., of a power brick, etc.). In various examples, where one or more controllable latches demand power for operation, power may be provided such that access is possible, given entry of a proper code.

As an example, a component space of a computing device can be physically secured using one or more controllable latches where the component space may be inaccessible via use of a tool such as a screwdriver to turn one or more screws. As an example, a component space may be formed of shells that are held together in a screw-less manner. As an example, a component space defined by shells can be tamper-resistant where edges may be formed in a manner that makes them difficult to pry. For example, consider small clearances between shells where a tool would have to be likewise quite small to fit into one of such clearances. As to some examples of small clearances, consider a smartphone where the display and case mate where even a small screwdriver may be unable to access a joint formed between an edge of the display and an edge of the case. As an example, shells may be held together with considerable force (e.g., magnetic force) and/or via mechanical features. As an example, a latch can be a magnetic latch and/or a mechanical latch.

As explained, a controllable latch can be utilized to secure shells that define a component space where a code is required for releasing a controllable latch. As an example, a computing device may include multiple component space access hatches where each may be secured by one or more controllable latches, which may or may not share a common code.

Figure 6:
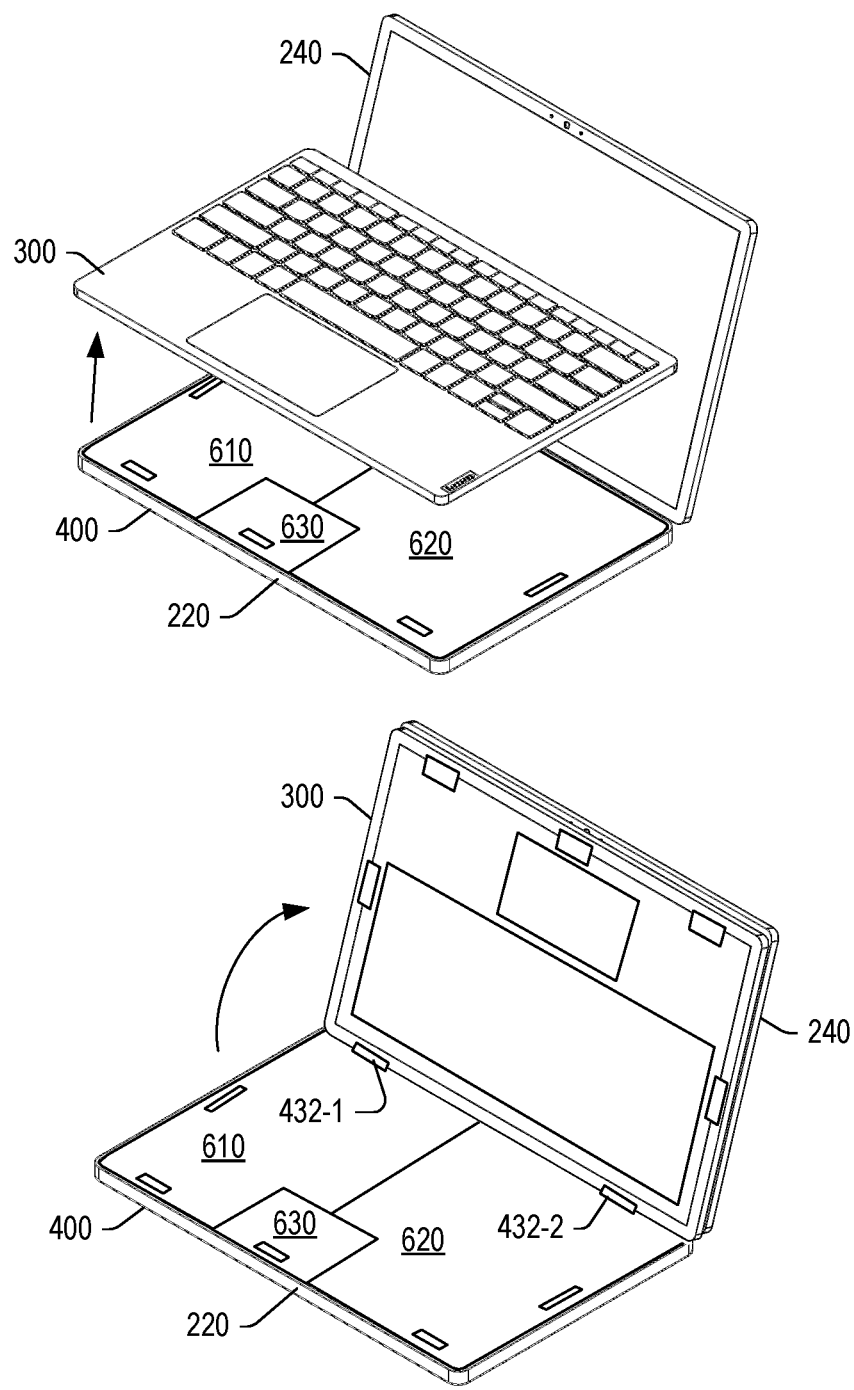
FIG. 6 is a series of diagrams of an example of a computing device.

FIG. 6 shows examples of a computing device 200 that includes a base housing 220 and a display housing 240 that can be coupled via one or more hinge assemblies where the base housing 220 includes the shells 300 and 400 that define a component space for various components 610, 620 and 630. As shown, the shell 300 can include a keyboard and optionally a touchpad where the shell 300 can be releasable for detachment as indicated in an upward translation of the shell 300 and/or where the shell 300 can be releasable for rotating via one or more hinge assemblies 432-1 and 432-2 that couple the shell 300 to the shell 400 (e.g., directly or indirectly). As shown, upon release of the shell 300, the component space can be accessible to access the components 610, 620 and 630.

As explained with respect to the example of FIG. 5, the shell 300 and/or the shell 400 can include one or more controllable latches. As an example, a controllable latch can include a portion that is fit to one shell and another portion that is fit to another shell. In such an example, portions can cooperate for latching the shells such that they secure the component space.

Figure 7:
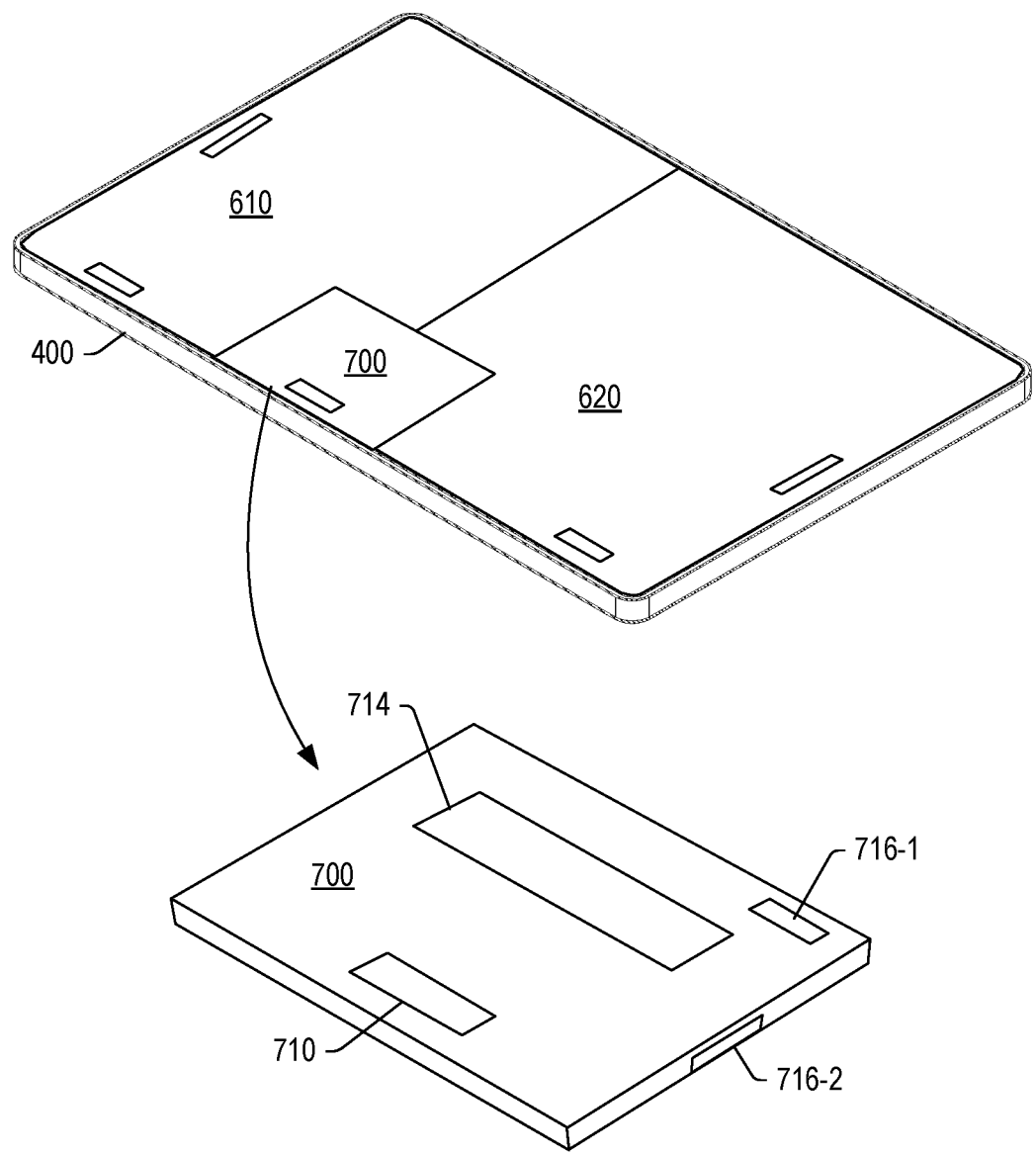
FIG. 7 is a series of diagrams of examples of components positionable in a component space.

FIG. 7 shows an example of the shell 400 with components 610, 620 and 700 in the component space. In the example of FIG. 7, the component 700 can be a security module that provides circuitry for latch control and that can include at least a portion of a controllable latch. As shown, the component 700 can include at least a portion of a controllable latch 710, circuitry 712 for latch control, one or more physical input interfaces 714, one or more electrical interfaces 716-1 and 716-2 for one or more of power, data and signals, and optionally one or more power sources 718. As mentioned, a component can include a trusted platform module (TPM) and/or one or more security chips, which may provide for encrypting, decrypting, secure operations, etc.

As an example, an electrical interface can be operatively coupled to a keyboard, which may be part of a shell. In such an example, a code entered via the keyboard can be received by the component 700.

Figure 8:
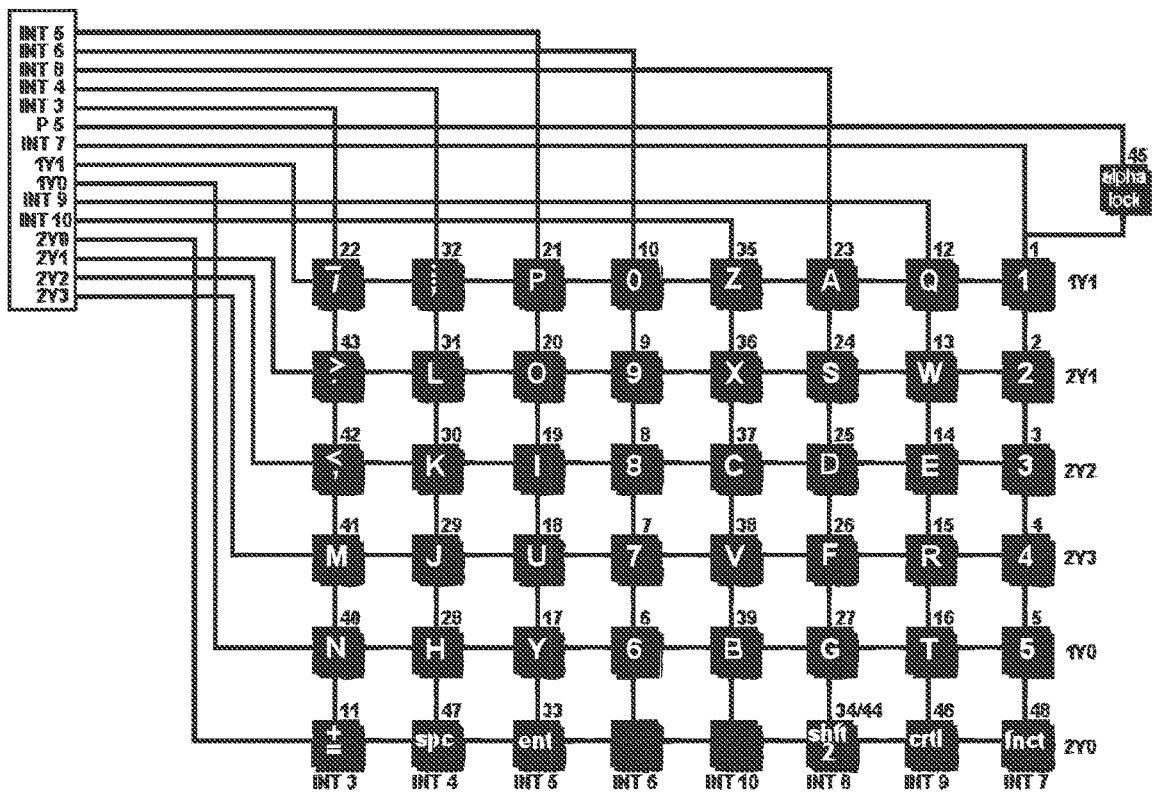
FIG. 8 is a series of diagrams of examples of keyboard features.

FIG. 8 shows an example of a QWERTY keyboard 810 and an example of a circuit logic structure 830 that includes a number of electrical lines that can be joined at a connector such as, for example, a pin connector; noting that one or more other types of connectors may be utilized. As an example, a serial connector may be utilized optionally where a number of lines are routed to a USB type of connector.

In the example of FIG. 8, the QWERTY keyboard 810 includes a line that demarcates left hand and right hand portions that can be standardized for two handed touch-typing. The circuit logic structure 830 shows how various signals can be generated upon actuation of a key or keys of a keyboard. While a QWERTY keyboard is shown as an example, one or more other types of keyboards, keypads, etc., may be utilized. For example, consider a keyboard with a number of keys that can be utilized for code entry. In such an example, the number of keys may be three or greater such that a secure code can be provided, which may take into account simultaneous activation of keys. For example, with three keys and 0 and 1 states, seven different codes may be provided where 0 0 0 is consider a null or native state. With four keys, the number of codes in such an example increases to fifteen, again, with 0 0 0 0 being a null or native state. Where a keyboard with 40 keys is utilized, a theoretical number of codes is 1,009,511,627,776; noting that a number of keys utilized in a code may be, for example, generally less than 10 (e.g., all ten fingers simultaneously pressing keys).

As an example, a computing device can include circuitry that detects number of attempts and that may take one or more actions responsive to a number of failed attempts. For example, consider a lock-out period of an hour or a day and/or transmission of a signal via a network as a notification that someone may be tampering with the computing device. As an example, a computing device may include a software code and a hardware code where both may be required for release of one or more controllable latches. For example, a keyboard may demand entry of a password as a software code for use of the keyboard via BIOS, firmware and/or an operating system while a hardware code can be entered via the keyboard once use of the keyboard is enabled.

As an example, a code can be a key code where one or more keys are actuated to generate an electrical representation of the code. For example, consider a code that demands actuation of the "z" key and the "p" key simultaneously. According to the circuit logic structure, the "z" key can cause the lines INT 10 and 1Y1 to be activated and the "p" key can cause the lines INT 5 and 1Y1 to be activated. As an example, circuitry can respond to such lines being activated. For example, consider electrical taps on the lines INT 5, INT 10 and 1Y1 where circuitry (e.g., switches, etc.) requires activation of these three lines to cause circuitry such as the circuitry 712 of the component 700 to be actuated for controlled release of the controllable latch 710.

In the foregoing example where a code depends on simultaneous actuation of the "z" and "p" keys, note that the "z" key is conventionally a left hand key and the "p" key is conventionally a right hand key. In such an approach, by defining a code using two different hands (e.g., considerable spacing between keys), risk of entry of the code (e.g., a secret code) inadvertently is reduced. Further, the keys "z" and "p" may be unlikely to be typed in a sequence whereby both keys would be actuated at the same time. While the foregoing example refers to two keys, more than two keys may be utilized as part of a code. For example, consider "z", "p", "q" and "0".

FIG. 9 shows some examples of hardware components 910, 920, 930, 940 and 950, which are hardware interface components. For example, the component 910 is a dip switch with a number of selectable switches that can be utilized to set a code through hand contact, optionally in combination with one or more other components; the component 920 is a rotatable switch with 10 positions that can be utilized to set a code through use of a tool such as a flathead screwdriver, optionally in combination with one or more other components; the component 930 is a rotatable switch with 10 positions that can be utilized to set a code, optionally in combination with one or more other components, through hand contact where the component 930 can include a base 932 and a plug in tool 934; the component 940 is a rotatable switch that can optionally be used in combination with one or more other components and that can include a view window; and the component 950 is a jumper assembly with a base 952 and one or more plugs 954-1 and 954-2 that can be positioned by hand with respect to a number of bases to set a code, optionally in combination with one or more other components.

As an example, various circuits may be established through use of one or more of hardware components, which may provide for tapping into lines of a keyboard such that a code of various key presses can be registered by circuitry to control a controllable latch. As an example, a number of switches can be positioned to represent a code that can be entered via a keyboard. In the example referencing the "z" and "p" keys, three lines can be involved, which may be for three switches in series that are to be completed (e.g., electrically connected) to represent proper entry of a code. In such an example, various lines may be electrically connected to one or more jumpers, dip switches, etc., where a particular line or particular lines are selected depending on the setting of the one or more jumpers, dip switches, etc., which, via such selection, act to define a code. As explained, manual adjustment (e.g., with or without a tool, depending on type of hardware component) to one or more hardware components can change a code.

As an example, a computing device can have a default code. For example, consider a jumper base with no plug where a plug holder may be provided with a plug that can be removed from the plug holder (e.g., a dummy base) and positioned in a jumper base to set a code. As an example, a hardware component may allow for turning on and turning off a security mechanism for latch release.

As an example, a controllable latch can include one or more components, which may be magnetic, electrical, electromagnetic, mechanical, etc.

Figure 10:
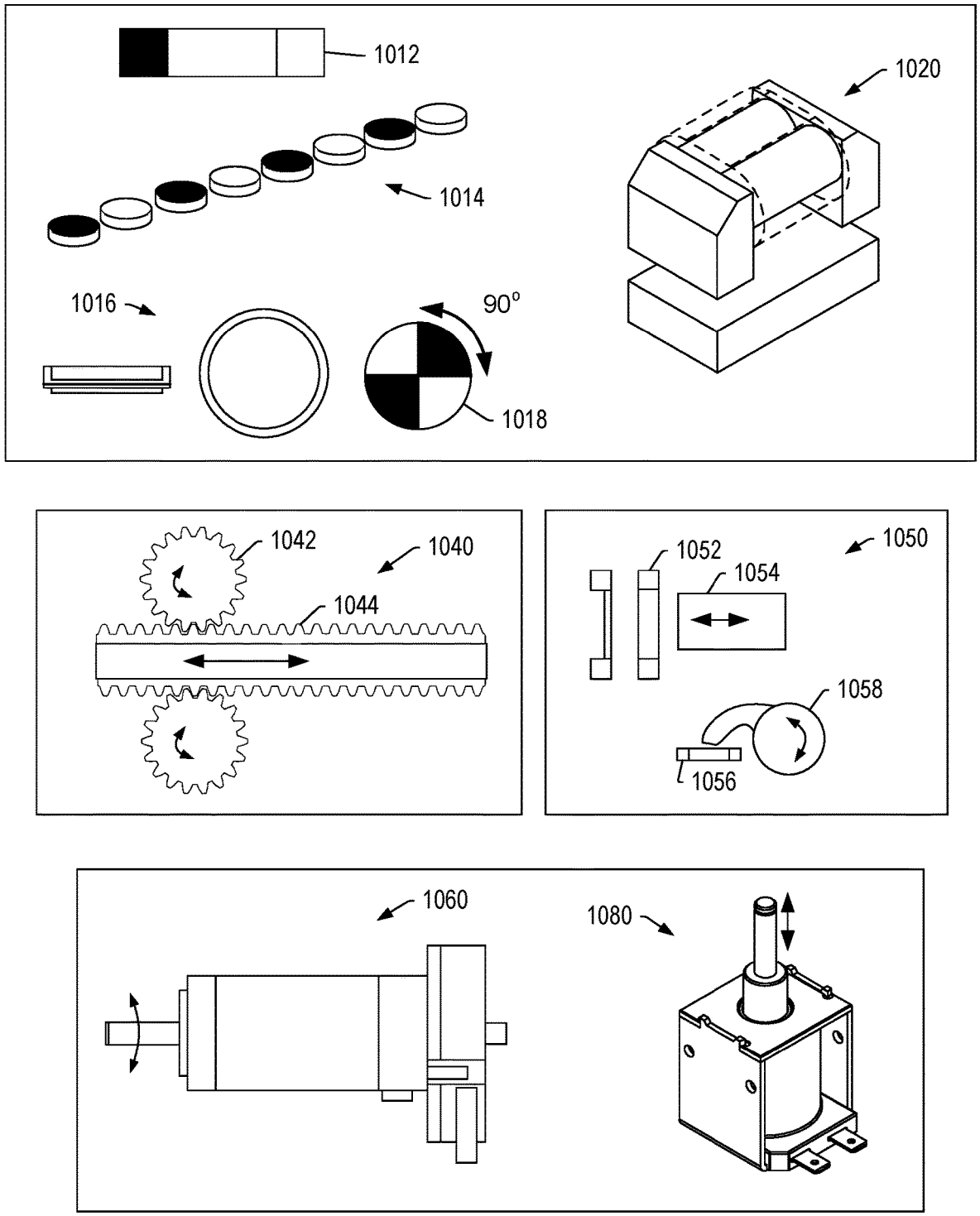
FIG. 10 is a series of diagrams of examples of magnetic components, mechanical components and electromagnetic components.

FIG. 10 shows some examples of components, which can include magnetic components 1012, 1014, 1016, 1018 and 1020. As shown, the magnetic component 1012 may be a bar magnet, the magnetic components 1014 can be a series of magnets of particular polarity (e.g., consider POLYMAGNET magnets with customizable polarities), the magnetic component 1016 can include a disk with magnets 1018 arranged in a particular order, and the magnetic component 1020 can be an electromagnetic component such as, for example, an electropermanent magnet.

As an example, a device can include one or more magnets such as, for example, one or more POLYMAGNET magnets (Correlated Magnetics Research, LLC, Huntsville, Alabama). As an example, a device may include an arrangement of magnets that aims to provide attraction between components without generating an excessively strong field that may extend well beyond the magnets. As an example, coding of small magnetics arranged in series, in parallel, in one or more arrays, etc. may be utilized for magnetically coupling components of a computing device, optionally without using a mechanical coupling.

A magnet such as a POLYMAGNET magnet can be formed from rare earth magnetic material with desired patterns of north and south poles on a single piece of magnetic material. In such an approach, fields coming off of these patterns of north and south poles in turn define the feel and function of a POLYMAGNET magnet with respect to another magnet or magnets, which may also be or include one or more POLYMAGNET magnets.

An electropermanent magnet (EP magnet or EPM) is a type of permanent magnet in which the external magnetic field can be switched on or off, for example, using a current pulse. An EPM can include a "hard" magnetic material (e.g. a relatively high coercivity, e.g., NdFeB or NIB) and a "soft" magnetic material (e.g., a relatively low coercivity, e.g., AlNiCo such as Alnico5), which can be capped at ends with a magnetically soft material (e.g., iron, Fe) and wrapped in a coil. When magnetically soft and hard materials of an EPM have the same magnetization, the EPM produces an external magnetic field that corresponds to an on-state, and when directions of magnetizations are reversed, the EPM produces no net external field across its poles, which corresponds to an off-state. As an example, an EPM can have a magnetic field with no electrical power being supplied to maintain the magnetic field where, if switching is desired, electrical power can be supplied to effectuate switching. As an example, an EPM can be switchable according to a schedule, a signal, etc., where power consumption may be relatively small while in an on-state the EPM provides sufficient magnetic field strength (e.g., for attraction and/or repulsion).

NdFeB (NIB) tends to have a relatively large coercivity (1000 kA/m), while Alnico5 tends to have a relatively small coercivity (48 kA/m); noting both have approximately the same residual induction: 1.28 T and 1.26 T, respectively. When a pulse current (e.g., a current pulse) passes through a coil (e.g., a copper coil, etc.), the polarity of an Alnico5 magnet can change while polarity of a NIB magnet remains the same. In such an example, magnetic field changes according to the polarity of the Alnico5 magnet.

As an example, an EPM can be provided with a keeper such as a keeper bar. An EPM can include a coil disposed about materials such as, for example, consider a parallel combination of NIB (NdFeB), which has a relatively high coercivity, and Alnico (AlNiCo), which has a relatively lower coercivity (e.g., consider Alnico5). As a NIB magnet has a quite high coercivity, flux through it can be maintained along a common direction. As an example, when an EPM is in its off-state, the NIB and Alnico magnets can be oppositely magnetized, such that flux circulates internally and does not cross air gaps to a keeper bar. When an EPM 600 is in its on-state, the NIB and Alnico magnets can be magnetized in the same direction, such that the flux from both crosses through to a keeper bar, and force is required to pull the portions apart. As explained, an EPM can be configured to be in a native magnetized state, which can be considered an on-state, where upon supply of energy (e.g., electrical power), the magnetic field strength of the EPM can be reduced, which may be considered an off-state or a partially-on state.

FIG. 10 shows some examples of mechanical components 1040, which can include rotating components 1042 and/or translating components 1044. As shown, a rack and pinion arrangement of components may be utilized to transform translational and rotational movements. For example, the translating component 1044 can be a rack while the rotating component 1042 can be a pinion gear that can rotate to translate the rack or that can be rotated via translation of the rack.

FIG. 10 shows some examples of mechanical components 1050, which can include one or more translating components 1054 and/or one or more rotating components 1058. As shown, the translating component 1054 can be a bar that can be inserted into and out of a recess of a keeper 1052 and the rotating component 1058 can include a prong that can be inserted into and out of a recess of a keeper 1056. In such examples, one component may be fixed to one shell and another component may be fixed to another shell, which may be a hatch (e.g., a component space access hatch).

FIG. 10 shows some examples of electromagnetic components 1060 and 1080. As shown, the component 1060 is a stepper motor that can rotate a shaft and the component 1080 is a solenoid that can translate a shaft. As an example, one or more components can be operatively coupled to one or more electromagnetic components such that rotation and/or translation generated by the one or more electromagnetic components can result in latching and unlatching a controllable latch.

As an example, the magnets 1018 may be coupled to an electromagnetic mover to rotate the magnets 1018. In such an example, the magnets may be rotated by 90 degrees or by another number of degrees, which can depend on a pattern of the magnets 1018. In such an example, one shell may include a similar pattern of magnets that is fixed where rotation of the magnets 1018 can cause alignment of opposing poles for purposes of generation of a magnetic attraction force or alignment of common poles for purposes of generation of a magnetic repulsion force. Where a magnetic repulsion force is generated, it may result in popping a hatch, which may hover in place a distance above a shell. For example, where the hatch is horizontal, gravity acting on the hatch may oppose the repulsion force such that a desired separation distance is created between the hatch and the shell. In such an example, slight movement of a hatch can be a visual indicator that the code entered was the correct code. As an example, where a hatch includes a keyboard, a keyboard may have a flexible connector that provides for use of the keyboard when it is popped, though such a connector may be disengaged upon further movement of the keyboard (e.g., lifting up or rotating up).

As explained, a computing device can include one or more controllable latches, which may be magnetic, electromagnetic and/or mechanical. As explained, a computing device can include circuitry that can be operatively coupled to a controllable latch to cause the latch to release (e.g., unlock) a hatch and to lock a hatch. As explained, circuitry can operate according to a code or codes for purposes of latching (e.g., locking) and unlatching (e.g., unlocking) one or more controllable latches.

As an example, a notebook computing device can include a keyboard for typing one or more codes to release/unlock and lock a controllable latch or controllable latches. As explained, a mechanism can include, for example, a servo-mechanism coupled to a power source.

As explained, use of one or more controllable latches can enhance security, optionally with lesser utilization of screws or no utilization of screws to secure shells to one another.

FIG. 11 shows an example of a method 1100 with respect to the shells 300 and 400 and one or more controllable latches 510-1 and 510-2 along with one or more power sources 520 and circuitry 540 where a tongue 482 of the shell 400 can cooperate with a groove 382 of the shell 300 (e.g., or vice versa) and where a spring 383 may be present, for example, as a mechanical or a magnetic spring. As an example, one or more tongues and one or more grooves may be utilized for purposes of alignment, security, physical connection, etc., between the shells 300 and 400 where the shell 300 can include one or more tongues and/or one or more grooves and where the shell 400 can include one or more grooves and/or one or more tongues.

As shown in the example of FIG. 11, in a latched state 1110 the tongue 482 can be received by the groove 382 where a portion of the tongue 482 hinders translation in a direction required for removal of the shell 400 from the shell 300. In the latched state 1110, the controllable latch 510-1 may be magnetic or electromagnetic and provide sufficient magnetic attraction force to overcome a spring force as may be present from a mechanical spring or a magnetic spring, the latter of which may be controllable via circuitry. In an unlatched state 1120, release of the controllable latch 510-1 allows the shell 400 to be moved upwardly such that the tongue 482 moves in the groove 382 such that alignment occurs. In a translational state 1130, the tongue 482 can be translated in the groove such that the shell 400 can be translated with respect to the shell 300 for access to one or more components in a housing formed by the shells 300 and 400.

As explained, one or more mechanisms may be included in a housing such that shells of the housing are properly aligned when closed, facilitate coupling or decoupling (e.g., joining and disjoining), provide for additional security, etc. For example, in FIG. 11, the tongue 482 can provide a mechanical stop with respect to the groove 382 such that translation of the shell 400 with respect to the shell 300 is mechanically hindered, for example, along with being hindered via a magnetic attraction force and/or another force and/or other mechanism.

In the example of FIG. 11, one or more components may be utilized to provide for a translational force that can facilitate movement of the tongue 482 in the groove 382. For example, an end of the tongue 482 may be biased using a spring, which may be a mechanical spring and/or a magnetic spring (e.g., via magnetic repulsion and/or magnetic attraction). As an example, the tongue 482 can include a magnet that is repelled by another magnet such that translation of the tongue 482 in the groove 382 is facilitated by the repulsion.

FIG. 12 shows an example of a method 1200 that includes a generation block 1210 for generating a code for a plurality of computing devices, where each of the computing devices includes a base housing that includes a shell and a component space access hatch that define a component space, a controllable latch, and circuitry operatively coupled to the controllable latch that unlocks the component space access hatch responsive to receipt of the code; a unlock block 1220 for, responsive to receipt of the code by one of the computing devices, unlocking the component space access hatch; and a change block 1230 for, for at least the one of the computing devices, changing the code. In such an example, the method 1200 can include issuing a signal via a network to change one or more codes, optionally to a number of the computing devices (e.g., two or more of the computing devices). As an example, unlocking the component space access hatch can include passing current through a hardware component disposed in the component space. As explained, a hardware component can include one or more of jumpers and dip switches. As an example, changing a code can include adjusting a hardware component.

As an example, a base housing can include a keyboard where a code is received from the keyboard. In such an example, a power source can be included where receipt of the code from the keyboard electrically couples the power source and the circuitry. For example, depression of keyboard keys may cause the power source to couple to the circuitry where the power source may be a dedicated power source that can be utilized even where a main battery of a computing device is drained.

As an example, a service provider, a user, etc., may be able to decouple shells but may not be able to recouple them and/or reset a computing device that includes the shells without proper authorization. As an example, consider a user or service provider that aims to replace a field replaceable unit (FRU) where upon replacement the user or service provider must access information on a website to indicate that the component was installed, optionally with specifics as to the component and/or the component that was replaced (e.g., consider serial number or other identifying information as to the component and/or its condition). Once such appropriate entry or entries are made, which may be automated or semi-automated (e.g., consider using a cell phone camera, etc.), the user or service provider may be provided with a code or other credential that can be entered to cause supply of electrical power to one or more controllable latches and/or to take one or more other actions (e.g., security measures, resets, firmware checks, etc.) such that the shells can be coupled and the components of the housing ready for use upon an appropriate boot procedures. In such an example, the website may be part of a distributed computing system that can include one or more storage devices for storing information germane to a computer such as a notebook computer. For example, consider storing information such as service history, code history, etc.

As an example, the device 200 can include various features of a notebook or laptop computer such as the LENOVO THINKPAD X1 CARBON laptop, which has exterior dimensions of 33 cm×23 cm×1.8 cm, equating to a total volume of 1,366.2 $cm^3$; noting that the keyboard housing is a fraction of the total volume (e.g., approximately 0.7 or 70 percent). Components of a clamshell laptop are disposed in a keyboard housing and in a display housing. Components disposed in a keyboard housing include a keyboard assembly (e.g., backlit keyboard with keyboard bezel and trackpad) and can include, for example, a micro-SIM-card-tray bracket, a micro-SIM-card tray, a system board assembly, a thermal fan, a RJ45 card with USB connector, a fingerprint reader assembly, a battery, one or more speaker assemblies, a wireless WAN card, a wireless LAN card, an audio card with USB connector, a M.2 solid-state drive, a dc-in bracket, a coin-cell battery, and an Ethernet extension adapter. As to components disposed in a display housing, consider an LCD unit, an LED unit, digitizer circuitry, touch circuitry, etc. As explained, a keyboard housing can include a C-cover and a D-cover that can be joined to form the keyboard housing and define a space therein for various components. As explained, such a keyboard housing can include one or more controllable latches for purposes of joining a C-cover and a D-cover (e.g., shells), which may be in a manner that provides for integration with circuitry for one or more purposes (e.g., security, tamper detection, servicing, ease of manufacture, quality control, etc.). As explained, a shell may be a hatch or, for example, a shell can include a hatch, which may be a sub-shell.

As an example, a computing device can include firmware instructions stored in memory that are executable by a processor to establish a firmware environment. In such an example, latch control circuitry of the computing device may be controllable via the firmware environment. As an example, a status of latch control circuitry may be detectable via a firmware environment.

As an example, a computing device can include a processor; memory accessible to the processor; a display housing that includes a display operatively coupled to the processor; a base housing that includes a keyboard operatively coupled to the processor, a shell and a component space access hatch that define a component space, and a controllable latch to lock and unlock the component space access hatch; a hinge assembly that couples the display housing and the base housing; and circuitry operatively coupled to the keyboard and the controllable latch that unlocks the component space access hatch responsive to receipt of a code from the keyboard.

As an example, a code can be settable by software and/or by hardware. As an example, a code may be settable via a network, a thumb drive, etc. As an example, a hardware settable code can be set by hardware that is disposed in a component space. In such an example, the hardware can include selectable electrical connectors. For example, consider selectable electrical connectors that can include one or more of jumpers and dip switches.

As an example, a code can be a simultaneous multi-key code received from a keyboard. In such an example, the simultaneous multi-key code can include keys that, according to a typing standard, are assigned to different hands. In such an example, two handed entry of code can help to avoid erroneous entry.

As an example, a computing device can include a power source where a controllable latch can be selectively powered via circuitry by power from the power source. In such an example, a power source can be or include a battery and/or can be or include a capacitor.

As an example, a controllable latch can include a magnet where, for example, a position of the magnet is controllable via circuitry. As an example, a magnetic field of a magnet can be controllable via circuitry. As an example, a magnet may be a permanent magnet, an electromagnet or an electropermanent magnet.

As an example, a magnetic attraction force can be utilized to lock a component space access hatch. As an example, a magnetic repulsion force can be applied to a component space access hatch. For example, a magnetic repulsion force can be applied to a component space access hatch responsive to unlocking of a latch.

As an example, a computing device can include a processor that is disposed in a component space. In such an example, the memory can be disposed in the component space.

As an example, a computing device can include a keyboard that is coupled to a component space access hatch.

As an example, a computing device can include a component space access hatch hinge that couples a component space access hatch to a shell.

As an example, a method can include generating a code for a plurality of computing devices, where each of the computing devices includes a base housing that includes a shell and a component space access hatch that define a component space, a controllable latch, and circuitry operatively coupled to the controllable latch that unlocks the component space access hatch responsive to receipt of the code; responsive to receiving the code by one of the computing devices, unlocking the component space access hatch; and, for at least the one of the computing devices, changing the code. As an example, changing the code can include issuing a signal via a network, which may be to more than one computing device. As an example, unlocking a component space access hatch can include passing current through a hardware component disposed in a component space. In such an example, the hardware component can include one or more of jumpers and dip switches. As an example, changing a code can include adjusting a hardware component.

As an example, a base housing can include a keyboard where a code is received from the keyboard. In such an example, the base housing can include a power source where receipt of the code from the keyboard electrically couples the power source and the circuitry. For example, depression of keyboard keys can causes a power source to couple to circuitry where, for example, the power source may be a dedicated power source (e.g., to provide power if a main battery of the base housing is drained or otherwise dead).

As an example, a base housing can include multiple hatches where a single code or multiple codes may be utilized to control release of one or more of the hatches.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 13:
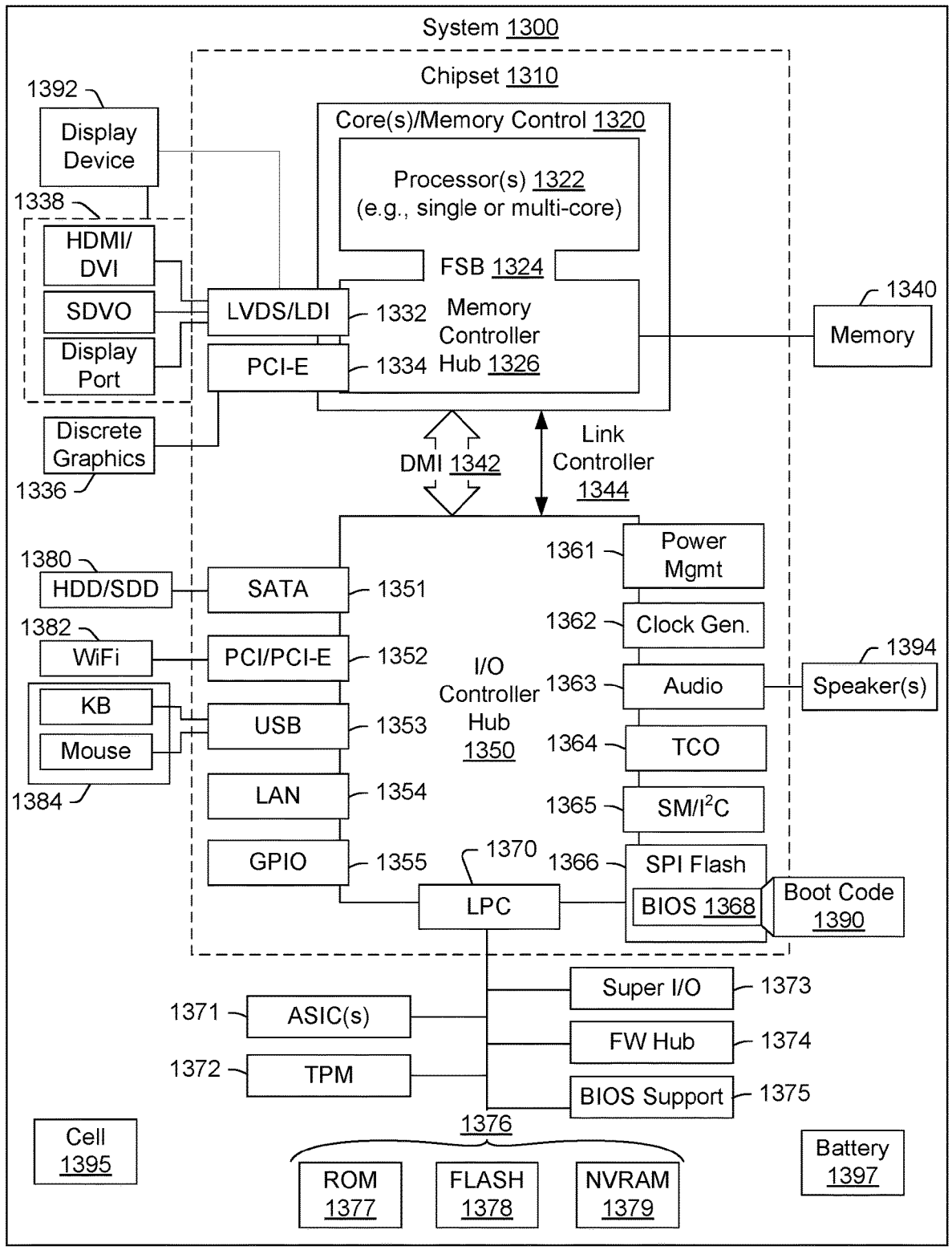
FIG. 13 is a diagram of an example of a system that includes one or more processors.

While various examples of circuits or circuitry have been discussed, FIG. 13 depicts a block diagram of an illustrative computer system 1300. The system 1300 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a satellite, a base, a server or other machine may include other features or only some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG.

13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300). As an example, a SMBus may be operable via a LPC (see, e.g., the LPC interface 1370), via an I²C interface (see, e.g., the SM/I²C interface 1365), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
 a processor;
 memory accessible to the processor;
 a display housing that comprises a display operatively coupled to the processor;
 a base housing that comprises a keyboard operatively coupled to the processor, a shell and a component space access hatch that define a component space, and a controllable latch to lock and unlock the component space access hatch;
 a hinge assembly that couples the display housing and the base housing; and
 circuitry operatively coupled to the keyboard and the controllable latch that unlocks the component space access hatch responsive to receipt of a code from the keyboard.

2. The computing device of claim 1, wherein the code is a settable by software.

3. The computing device of claim 1, wherein the code is a settable by hardware.

4. The computing device of claim 3, wherein the hardware is disposed in the component space.

5. The computing device of claim 4, wherein the hardware comprises selectable electrical connectors.

6. The computing device of claim 5, wherein the selectable electrical connectors comprise one or more of jumpers and dip switches.

7. The computing device of claim 1, wherein the code comprises a simultaneous multi-key code received from the keyboard.

8. The computing device of claim 7, wherein the simultaneous multi-key code comprises keys that, according to a typing standard, are assigned to different hands.

9. The computing device of claim 1, comprising a power source, wherein the controllable latch is selectively powered via the circuitry by power from the power source.

10. The computing device of claim 9, wherein the power source comprises a battery.

11. The computing device of claim 9, wherein the power source comprises a capacitor.

12. The computing device of claim 1, wherein the controllable latch comprises a magnet.

13. The computing device of claim 12, wherein a position of the magnet is controllable via the circuitry.

14. The computing device of claim 12, wherein a magnetic field of the magnet is controllable via the circuitry.

15. The computing device of claim 1, wherein a magnetic attraction force locks the component space access hatch.

16. The computing device of claim 1, wherein a magnetic repulsion force is applied to the component space access hatch responsive to unlocking of the latch.

17. The computing device of claim 1, wherein the processor is disposed in the component space and wherein the memory is disposed in the component space.

18. The computing device of claim 1, wherein the keyboard is coupled to the component space access hatch.

19. The computing device of claim 1, comprising a component space access hatch hinge that couples the component space access hatch to the shell.

\* \* \* \* \*